A. COPONY.
EGG CRATE.
APPLICATION FILED AUG. 6, 1915.
1,179,404.
Patented Apr. 18, 1916.
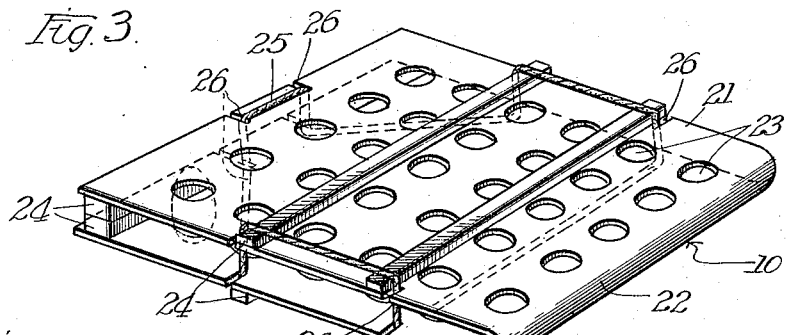
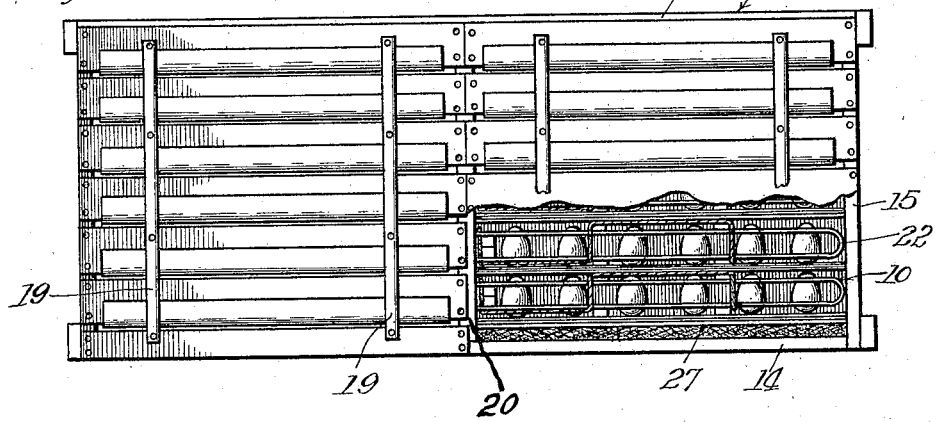
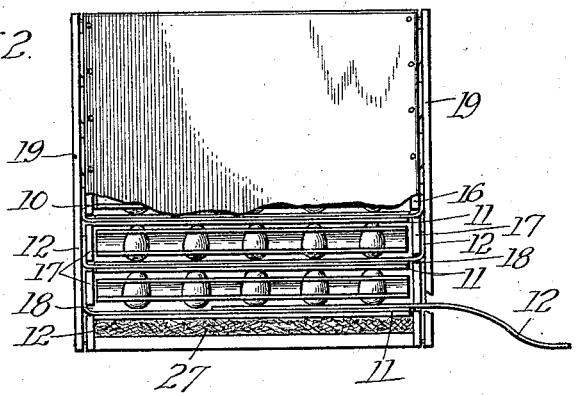
Witness
Robert H. Weir
Inventor
Alfred Copony
Jones, Addington, Ames, & Seibold
Attys

UNITED STATES PATENT OFFICE.

ALFRED COPONY, OF CHICAGO, ILLINOIS, ASSIGNOR OF THREE-FIFTHS TO CHARLES R. COOPER, OF CHICAGO, ILLINOIS.

EGG-CRATE.

1,179,404.    Specification of Letters Patent.    Patented Apr. 18, 1916.

Application filed August 6, 1915. Serial No. 44,067.

*To all whom it may concern:*

Be it known that I, ALFRED COPONY, subject to the Emperor of Austria-Hungary, residing at Chicago, in the county of Cook and State of Illinois, have invented new and useful Improvements in Egg-Crates, of which the following is a full, clear, concise, and exact description, reference being had to the accompanying drawing, forming a part of this specification.

My invention relates to egg crates and the like.

Among the objects of my invention are to provide a crate in which improved means are provided whereby it can be ascertained whether the eggs in the crate are damaged without taking the eggs out of the crate—to provide a crate in which the eggs will be well protected against jarring in handling the crate, in which ample provision is made for the circulation of air through the crate to permit cooling and in which an improved egg holding device is provided which will permit the eggs to be expeditiously handled in candling.

In the drawings in which I have shown one embodiment of my invention Figure 1 is a side elevation of an egg crate parts being broken away to show the interior construction; Fig. 2 is an end view of the crate, part of the end being broken away; and Fig. 3 is a perspective view of one of the folders or egg holding devices.

Referring now to the drawing in detail, I have shown my invention in connection with an egg crate comprising a casing indicated in general at 9, a plurality of folders or egg holding devices 10, a plurality of pasteboard sheets or partitions 11, and a plurality of sheets 12 of flexible material, such as wrapping paper, located beneath the layers of eggs. The casing 9 comprises a top or cover 13, a bottom 14, ends 15 and sides 16. The sides 16 are formed of strips 17 located to provide spaces 18 therebetween through which the flexible sheets 12 may be drawn when desired. Cleats 19 are provided for holding the loose ends of the flexible sheets 12 in place in shipping. The crate is shown as divided by a central partition 20.

The folder or egg holding device 10 comprises a sheet of pasteboard 21 which is folded over as shown at 22 to provide two opposed portions each of which is provided with a plurality of circular openings 23 into which extend the ends of the eggs whereby the eggs are held securely in place between the upper and lower portions of the folder, reinforcing strips or slats 24, which also serve to hold the portions of the pasteboard sheet in their proper relative positions, and a cord 25 for holding the two portions of the holder tightly against the eggs. The sheet of pasteboard 24 is provided with a number of slots 26 with which the cord engages and by which it is held in position. The portion of the cord 25 which extends between the upper two of the strips 24 serve as handles. If desired the holder may be made of heavy corrugated strawboard in which case the reinforcing strips 24 may be dispensed with.

The use of my improved device is as follows: The eggs are placed in position in the folder 10 and the cord 25 is drawn tightly to hold the eggs securely in position in the folder. A layer of excelsior 27 is then placed in the crate, a sheet of pasteboard 11 placed on top of the excelsior, two flexible sheets 12 placed on top of the pasteboard sheet 11, the edges of the flexible sheets 12 extending outwardly in opposite directions through the spaces 18, the folder full of eggs is then placed on top of the flexible sheets 12, another pasteboard sheet 11 placed on top of the eggs, and so on until the crate is filled with the layers of eggs in the folders.

For various reasons it is frequently desirable to determine whether the eggs in the crate have been injured without taking the eggs out of the crate, as, for instance, when the crates are received from a shipper it is desirable to know whether they have been injured in shipment, also before placing the crates in cold storage it is desirable to know whether any of the eggs have been injured. To determine this it is simply necessary to loosen the cleats 19 and draw out the flexible sheets 12 through the spaces 18 in the sides of the crate. If the eggs have been cracked or chipped so as to be materially injured the contents will have dripped down onto the flexible sheets 12 and stained these sheets so that an inspection of the sheets will show whether the eggs have been injured or not. The two sheets 12 are provided under each layer of eggs so that two inspections can be made, as it is often desirable that the condition of the eggs shall be determined twice, once when it is received from the shipper and again when it is to be placed in cold storage. Other occasions may arise when this double inspection is desirable.

It will be noted that the lower one of the two sheets which are placed between each layer will be held securely in position so that it will not be dragged out along with the top sheet when the latter is pulled out, as the edges of the lower sheet will be held between the sides of the crate and the cleats 19.

The specific structure of the folder 10 is also very advantageous as the folded over portion 22 of the holder forms a sort of shock absorber by coming in contact with the ends of the casing when the crate is jostled. The folder also has an advantage over the ordinary crate in which a cell is provided for each egg, as my improved form of holder provides for the free circulation of air around the eggs to permit of their proper cooling. The folder also provides a very convenient means for handling the eggs in candling, as the entire folder can be picked up with the eggs in place and the eggs candled without removing them from the holder by simply passing the holder with the eggs in place between the candle and the eye of the observer.

Having thus described my invention what I claim as new and desire to secure by Letters Patent is:—

1. In a device of the class described, means for holding a plurality of eggs in position, and means for determining whether the eggs are so damaged as to leak without removing the eggs from the holder comprising withdrawable means located beneath the eggs.

2. In a device of the class described, means for holding a plurality of eggs in position, and means for determining whether the eggs are so damaged as to leak without removing the eggs from the holder comprising withdrawable means located beneath the eggs, said holding means being constructed to hold the eggs in a layer, and said withdrawable means comprising a sheet located beneath the layer.

3. In a device of the class described, means for holding a plurality of eggs in position, and means for determining whether the eggs are so damaged as to leak without removing the eggs from the holder comprising withdrawable means located beneath the eggs, said holding means comprising a casing having an opening through which said withdrawable means may be withdrawn.

4. In a device of the class described, means for holding a plurality of eggs in position, and means for determining whether the eggs are so damaged as to leak without removing the eggs from the holder comprising withdrawable means located beneath the eggs, said holding means being constructed to hold the eggs in a layer and said withdrawable means comprising a sheet located beneath the layer, said holding means comprising a slot through which said sheet may be withdrawn.

5. In a device of the class described, means for holding a plurality of eggs in position, and means for determining whether the eggs are so damaged as to leak without removing the eggs from the holder comprising withdrawable means located beneath the eggs, said holding means being constructed to hold the eggs in superposed layers, and said withdrawable means comprising a plurality of sheets, one located beneath each layer.

6. In a device of the class described, means for holding a plurality of eggs in position, and means for determining whether the eggs are so damaged as to leak without removing the eggs from the holder comprising withdrawable means located beneath the eggs, said holding means being constructed to hold the eggs in superposed layers, relatively stiff sheets separating said layers and said withdrawable means comprising relatively flexible sheets, one located beneath each layer above the stiff sheet.

7. In a device of the class described, means for holding a plurality of eggs in position, and means for determining whether the eggs are so damaged as to leak without removing the eggs from the holder comprising withdrawable means located beneath the eggs, said holding means being constructed to hold the eggs in superposed layers, and said withdrawable means comprising a plurality of sheets, one located beneath each layer, said holding means comprising a casing having one side formed of spaced strips between which the sheets are withdrawable.

8. In a device of the class described, means for holding a plurality of eggs in position, and means for determining whether the eggs are so damaged as to leak without removing the eggs from the holder comprising withdrawable means located beneath the eggs, said holding means being constructed to hold the eggs in a layer, and said withdrawable means comprising a plurality of withdrawable sheets located beneath the layer.

9. In a device of the class described, means for holding a plurality of eggs in position, and means for determining whether the eggs are so damaged as to leak without removing the eggs from the holder comprising withdrawable means located beneath the eggs, said holding means being constructed to hold the eggs in a layer, and said withdrawable means comprising a plurality of withdrawable sheets located beneath the layer, one of said sheets being withdrawable in a different direction from the direction in which the other is withdrawable.

10. In a device of the class described, means for holding a plurality of eggs in position, and means for determining whether the eggs are so damaged as to leak without removing the eggs from the holder comprising withdrawable means located beneath the eggs, said holding means being constructed to hold the eggs in a layer, and said withdrawable means comprising a plurality of withdrawable sheets located beneath the layer, one of said sheets being withdrawable in a different direction from the direction in which the other is withdrawable, said holding means comprising slots through which said sheets may be withdrawn.

In witness whereof, I have hereunto subscribed my name.

ALFRED COPONY.

Copies of this patent may be obtained for five cents each, by addressing the "Commissioner of Patents, Washington, D. C."